United States Patent [19]

Bülow et al.

[11] Patent Number: 5,483,373
[45] Date of Patent: Jan. 9, 1996

[54] OPTICAL TRANSMITTER FOR THE COMMON TRANSMISSION OF ANALOG SIGNALS AND DIGITAL QAM SIGNALS

[75] Inventors: Henning Bülow, Ludwigsburg; Heinz Krimmel, Korntal-Münch, both of Germany

[73] Assignee: Alcatel N.V., BH Rijswijk, Netherlands

[21] Appl. No.: 258,508

[22] Filed: Jun. 10, 1994

[30] Foreign Application Priority Data

Jun. 11, 1993 [DE] Germany .................. 43 19 315.3

[51] Int. Cl.⁶ ............................................. H04B 10/04
[52] U.S. Cl. ........................................................ 359/181
[58] Field of Search ................................. 359/180, 181, 359/188

[56] References Cited

U.S. PATENT DOCUMENTS 4,864,649  9/1989  Tajima ........................ 359/181

FOREIGN PATENT DOCUMENTS 0261423  3/1988  European Pat. Off. ..
0359205  3/1990  European Pat. Off. ..
4293326  10/1992  Japan ........................ 359/180

OTHER PUBLICATIONS

"Analysis of BER of 16QAM Signal in AM/16QAM Hybnd Optical Tansmission System" Joy K. Maeda, et al. Electronic Letters, vol. 29, No. 7, pp. 640–642.

Electronic Letters, Bd. 24, Nr. 10, 12, May 1988, Stevenage GB, Seiten 611–613 W. I. Way et al. "Simultaneous transmission of 2 Gbit/s digital data and ten FM–TV analogue signals over 16.5 km SM fibre".

Patent Abstracts of Japan, vol. 15, No. 241 (E–1080) 21. Jun. 1991 & JP-A-03 074 942 (NEC).

Primary Examiner—Leslie Pascal
Attorney, Agent, or Firm—Ware, Fressola, Van Der Sluys and Adolphson

[57] ABSTRACT

An optical transmitter for the joint transmission of analog and digital signals is indicated, which, although it contains an optical transmitting component (5) with a laser, does not exhibit an increase in the bit error rate when transmitting the digital signals, due to so-called clipping. The clipping, a negative overmodulation of the laser to below the laser threshold, which occurs because of the constructive interference of the analog signal carders, is prevented by a limiter (8) located upstream of the modulation input of the optical transmitting component (5). The limiter contains a time-variant network that supplies a specified minimum voltage to the modulation input every time a comparator (7) determines that the modulation voltage has dropped below the predetermined threshold.

6 Claims, 2 Drawing Sheets

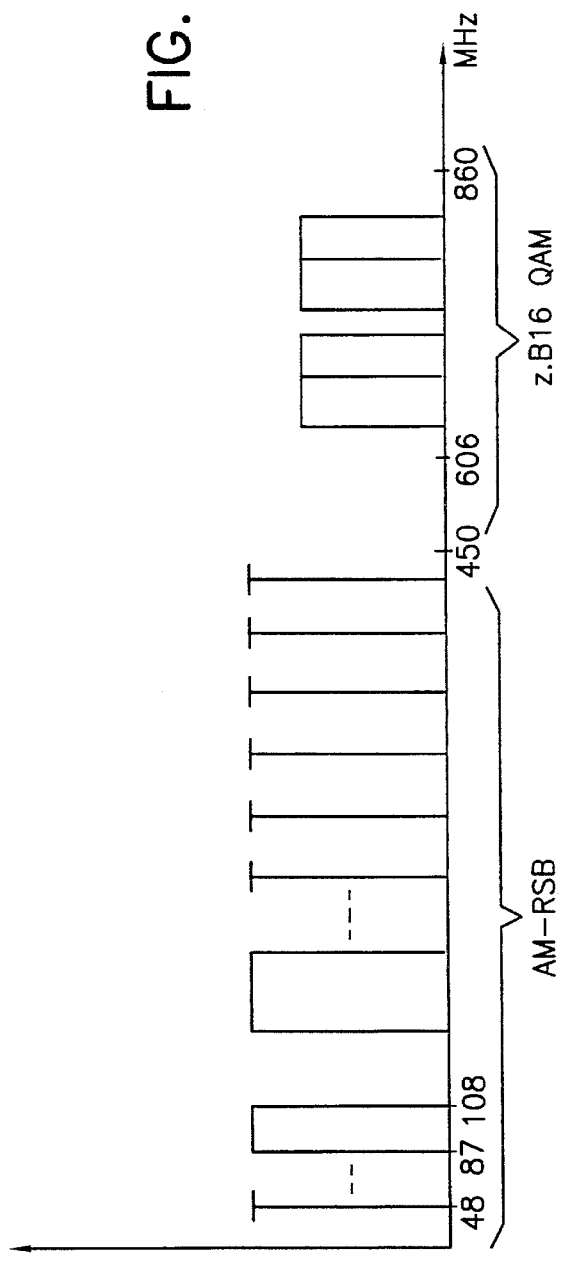
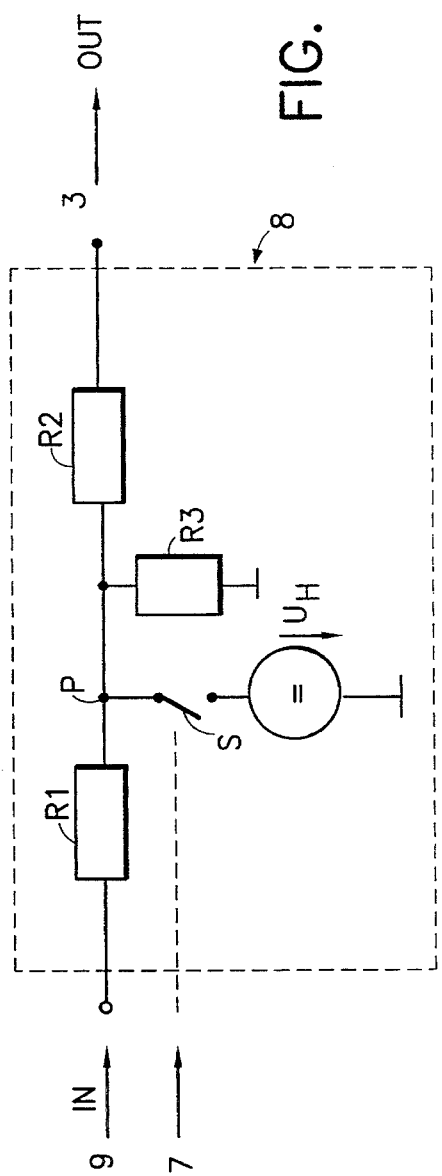

OPTICAL TRANSMITTER FOR THE COMMON TRANSMISSION OF ANALOG SIGNALS AND DIGITAL QAM SIGNALS

TECHNICAL FIELD

The invention concerns an optical transmitter for the common transmission of analog signal and digital signals.

BACKGROUND OF THE INVENTION

Such a transmitter is needed e.g. when signals of conventional services such as telephone, radio and analog cable TV are to be optically transmitted in conjunction with digital signals, e.g. QAM-signals, such as are provided for the transmission of CDV (Compressed Digital Video), by means of a laser or a laser diode.

Problems are created in that connection by so-called "clipping", a short-term disappearance of the optical carder due to dropping below the laser threshold current. Such dropping below the laser threshold current is caused by constructive interference of several analog modulated carder frequencies, which lead to an overmodulation of the laser toward the low current side. Although such overmodulation only takes place for an extremely short period of time, it requires restarting the laser, which takes considerably more time and results in a high bit error rate during the transmission of digital signals, e.g. QAM-signals.

This problem is described in an essay by K. Maeda et at, in Electronics Letters, Vol. 29, no. 7, page 640.

SUMMARY OF THE INVENTION

The task of the invention is an optical transmitter of the type named in the beginning, in which no disturbance is caused by clipping, and in which the bit error rate of the digital signals is correspondingly low.

Before the signal, which is supplied to the modulation input of the optical transmitting component, affects the laser contained therein, the amplitude limiter limits its amplitude dynamics so that an overmodulation of the laser to the point where it falls below its threshold current can no longer take place. Rather, a minimum value of laser current is maintained which guarantees the production of an optical carrier through the laser that can be modulated by the digital signal. The limitation of the modulation signal amplitude by simply cutting off extremely negative peaks has no deleterious effect on the signals to be transmitted, since the intervention is no more than what would otherwise take place in the laser in the event of an overmodulation.

The patent invention can also provide for amplitude limitation of only the analog signals to be transmitted while the digital signals that are also to be transmitted, which have low amplitude dynamics and are modulated to the carrier with an essentially low degree of modulation, are mixed without amplitude limitation to the amplitude-limited analog signals.

The optical transmitter is also directed to the possibility of performing an amplitude limitation of the analog modulation signals without continuously adding nonlinearities to the modulation signals, such as is the case when using antiparallel switched diodes (e.g. Schottky diodes).

Furthermore, the optical transmitter discloses that a possible time displacement between the modulation signal and the starting point of the limitation, which takes place by comparing with the threshold value, can be balanced by a corresponding time delay of the modulation signal.

Finally, the optical transmitter can provide for regulation of an impressed potential used for amplitude limitation, as a function of the frequency of clipping occurrences. This regulation automatically adapts the limitation to different degrees of modulation and to different bit error rates that must be tolerated.

BRIEF DESCRIPTION OF THE DRAWINGS

A configuration example of the optical transmitter according to the invention will now be described by means of two figures, and its function explained.

FIG. 1 depicts an overview of the different frequency ranges that are transmitted simultaneously.

FIG. 3 is a detailed block diagram of the limiter shown in FIG. 2.

BEST MODE FOR CARRYING OUT THE INVENTION

Figure 2:
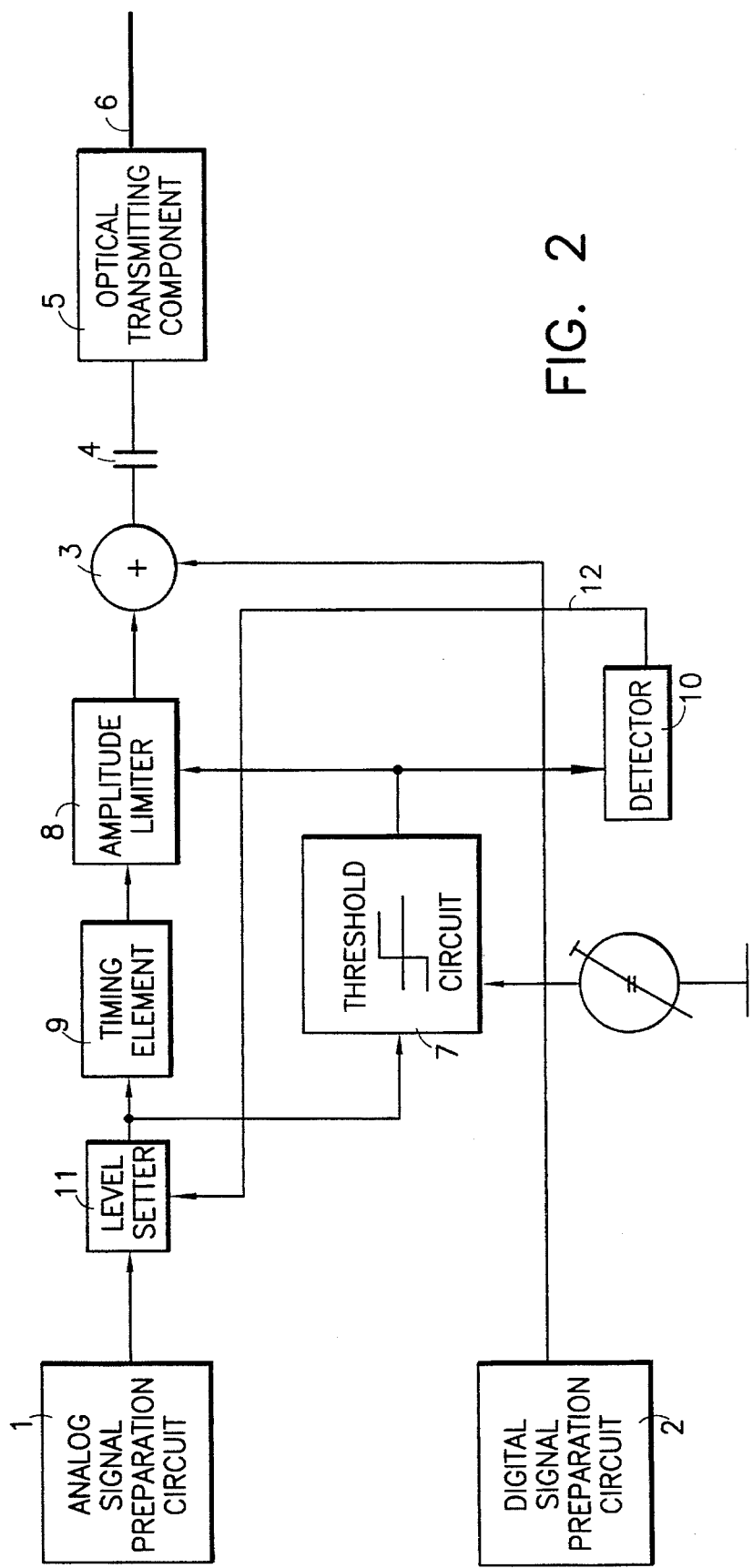
FIG. 2 depicts a block diagram of an optical transmitter according to the invention.

FIG. 1 schematically illustrates the frequency band to 860 MHz and the distribution of different services within this range, for example, TV and VHF radio transmission channels including channels for digital audio broadcasting, which until now were transmitted via coaxial copper cables (cable TV). The frequency band available for transmission is divided into a large number of channels, each of which has an auxiliary carrier assigned at a specified frequency distance from the neighboring channels. For transmission, the individual carriers are amplitude-modulated with the information to be transmitted, and are frequency-division-multiplexed as AM-RSB signals. If the transmission is to be optical, the amplitude-modulated carriers are used to modulate an optical transmitting component. In that case several modulated carders are simultaneously supplied to the optical transmitting component, a laser as a rule, or to a laser modulator that is optically coupled to a laser.

Different carders are constructively superimposed in cycles on the modulation signal, which is expressed by an extreme momentary value of the modulation signal, and on the negative modulation (control) side, turns off the laser because it has dropped below the laser threshold.

This short-term cut-off (clipping) of the laser, and the associated lack of optical carrier during the switch-off phase, and the relatively sluggish restart of the laser, do not disturb the transmission of the AM-RSB signals. However, it becomes disturbing if additional digital signals, e.g. QAM-signals, are to be transmitted as planned in the frequency range above 600 MHz, as shown in FIG. 1; this leads to an intolerable increase in the bit error rate.

FIG. 2 represents an optical transmitter according to the invention, which avoids the described disturbances.

A signal preparation (conditioning) circuit 1 contains all the components, not individually detailed here, required to produce the AM-RSB signals to be transmitted. Digital 16-QAM signals are supplied by a corresponding preparation circuit 2, and are added to the AM-RSB signals in a summer 3. Through a capacitive coupling 4, the mixed signals reach the modulation input of an optical transmitting component 5, e.g. a laser, whose optical output leads to an optical waveguide 6. According to the invention, the AM-RSB signal mix in FIG. 2 is not directly supplied to the summer 3, but its amplitude is limited by a preceding amplitude limiter 8. However, this does not take place by means of a simple known clamping circuit, e.g. two antiparallel switched Schottky diodes, which would add extra, undesirable nonlinearities to the signal, but rather with a time-variant network, which is controlled by a threshold circuit (comparator) 7, if the amplitude of the signal mix emitted by the preparation circuit 1 takes on a momentary value that is below a predetermined threshold, and which supplies a predetermined impressed voltage to the output line, thus preventing a cut-off of the optical transmitting component.

A detailed circuit diagram of limiter 8 is shown in FIG. 3. A fast switch S, such as a switching diode or an FET, is controlled by the comparator 7 (see FIG. 2). Limiter 8 applies a voltage level $U_H$ to node P of a network of resistors comprising $R_1$, $R_2$ and $R_3$. Resistor $R_1$ is connected to the output of delay element 9 while resistor $R_2$ is connected to summer 3 and thus this voltage level is presented to summer 3 when fast switch S is closed.

To establish coincidence between the signal value to be limited and the effectiveness of the limitation, a delay element 9 is provided at the input of the amplitude limiter 8, which delays the signal mix for the time required by the threshold circuit until the amplitude limiter is controlled.

In order to adapt the limitation of e.g. different degrees of modulation and required bit error rates, the optical transmitter has a detector 10, which detects and evaluates the number of limitation processes at the output of the threshold circuit 7. The output signal level of the preparation circuit 1 can be changed as a function of the frequency of such limitation processes by output 12 of detector 10 controlling the output of level setter 11.

We claim:

1. An optical transmitter for the joint transmission of at least two analog signals and digital signals with preparation circuits (1, 2) for supplying the analog signals and the digital signals, and with at least one optical transmitting component (5) containing a laser, the optical transmitting component having a laser modulation input, whose output signal is directly modulated with the signals to be transmitted, characterized in an amplitude limiter (8) having an input and an output, that .the analog signals are supplied through the amplitude limiter and wherein the optical transmitter includes a summer (3) having one input connected to the output of the amplitude limiter and another input connected to the digital signals so that the digital signals are mixed with the analog signals, wherein the analog signals are limited by the amplitude limiter so as to prevent clipping by the optical transmitting component (5) so that a minimum voltage is generated by the amplitude limiter to the modulation input before the analog signals can cause clipping of the optical transmitting component (5).

2. An optical transmitter according to claim 1, further comprising a comparator (7) having an input connected to the preparation circuit (1) of the analog signals, the output of the comparator connected to the amplitude limiter (8), the comparator generating a signal for causing the amplitude limiter (8) to generate said minimum voltage to the laser modulation input when the analog signals drop below a predetermined threshold.

3. An optical transmitter according to claim 2, wherein the optical transmitting component (5) is an external modulator optically coupled to the laser.

4. An optical transmitter for the joint transmission of analog signals and digital signals with preparation circuit (1, 2) for supplying the analog signals and the digital signals, and with at least one optical transmitting component (5) containing a laser, whose output is directly modulated with the signals to be transmitted, characterized in that an amplitude limiter (8) has an input and an output, that the analog signals are supplied through the amplitude limiter, wherein the optical transmitter further includes a summer (3) having one input connected to the output of the amplitude limiter and another input connected to the digital signals so that the digital signals are mixed with the analog signals, the output of the summer connected to the input of the optical transmitting component (5), further characterized by a comparator (7) having an input connected to the preparation circuit (1) of the analog signals, the comparator having an output connected to the amplitude limiter (8), the comparator generating a signal for causing the amplitude limiter (8) to generate a minimum voltage when the analog signals drop below a predetermined threshold, and further wherein the optical transmitter includes a delay element (9) having an input connected to the analog signals and an output connected to the amplitude limiter (8) so that the analog signals are delayed before being supplied to the amplitude limiter.

5. An optical transmitter according to claim 4, characterized in that the output of the comparator is connected to a detector circuit (10), which evaluates the frequency of the occurrence of drops below the threshold, and varies the level of the signals supplied to the optical transmitting component (5) through the amplitude limiter (8) in accordance with said frequency.

6. An optical transmitter for the joint transmission of analog signals and digital signals with preparation circuit (1, 2) for supplying the analog signals and the digital signals, and with at least one optical transmitting component (5) containing a laser, whose output is directly modulated with the signals to be transmitted, characterized in that an amplitude limiter (8) has an input and an output, that the analog signals are supplied through the amplitude limiter, wherein the optical transmitter further includes a summer (3) having one input connected to the output of the amplitude limiter and another input connected to the digital signals so that the digital signals are mixed with the analog signals, the output of the summer connected to the input of the optical transmitting component (5), further characterized by a comparator (7) having an input connected to the preparation circuit (1) of the analog signals, the comparator having an output connected to the amplitude limiter (8), the comparator generating a signal for causing the amplitude limiter (8) to generate a minimum voltage when the analog signals drop below a predetermined threshold, and further wherein the optical transmitter includes a level setter (11) connected between the analog signal preparation circuit (1) and the amplitude limiter (8) and further having a detector circuit (10) having an input connected to output of the comparator (7), the detector circuit evaluating the frequency of the occurrence of drops below the predetermined threshold, and having an output connected to the level setter (11) for causing the level of the analog signals supplied to the optical transmitting component (5) through the amplitude limiter to be varied in accordance with the evaluated frequency.

* * * * *